Figure 1:
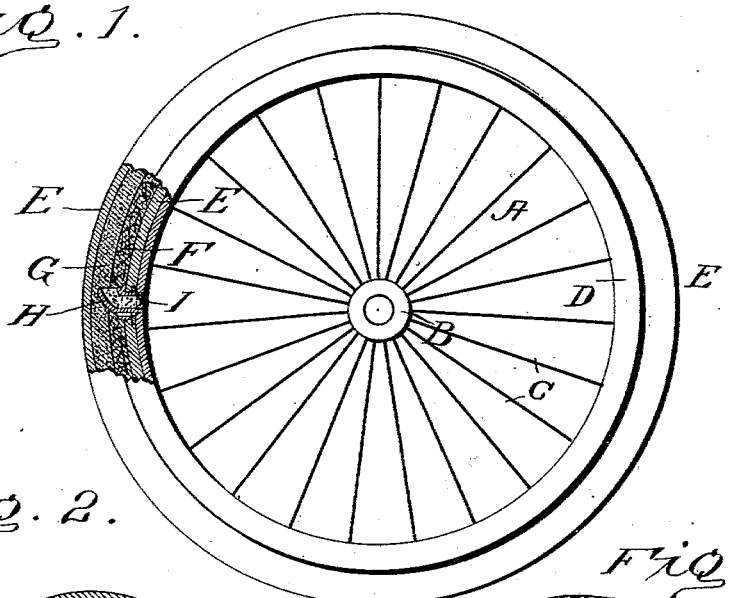

No. 753,205. PATENTED FEB. 23, 1904.
M. NIRDLINGER.
VEHICLE TIRE.
APPLICATION FILED JAN. 22, 1900. RENEWED MAR. 5, 1902.
NO MODEL.

Witnesses
N. Curtis Lemmond
R. B. Cavanagh

Inventor
Max Nirdlinger
by H. H. Bliss
his Attorney

No. 753,205. Patented February 23, 1904.

UNITED STATES PATENT OFFICE.

MAX NIRDLINGER, OF PHILADELPHIA, PENNSYLVANIA.

VEHICLE-TIRE.

SPECIFICATION forming part of Letters Patent No. 753,205, dated February 23, 1904.

Application filed January 22, 1900. Renewed March 5, 1902. Serial No. 96,842. (No model.)

*To all whom it may concern:*

Be it known that I, MAX NIRDLINGER, a citizen of the United States, residing at Philadelphia, in the county of Philadelphia and State of Pennsylvania, have invented certain new and useful Improvements in Vehicle-Tires, of which the following is a specification, reference being had therein to the accompanying drawings.

This invention relates to improvements in vehicle-tires, the object being to provide a tire having the advantages of the ordinary pneumatic tire and which shall be free from the disadvantages incident to articles of that sort.

The invention consists, among other things, in forming the tire with an exterior tube or sheathing of rubber or similar material having an interior chamber filled with a yielding elastic filler applied in such way that the filler becomes practically incorporated with and inseparable from the exterior tube or sheathing, the article in this respect differing essentially from the earlier ones of the same class having fillers of solid materials, but which fillers have in each case been more or less loosely inserted and have not adhered firmly to the interior surface of the outer tube.

The invention consists also in a tube having a filler formed in two or more parts, one of which is made independently of the exterior tube and inserted into it, and the other part of which is made by introducing a liquid or viscid composition into the tube, which material is capable of hardening or setting and forming a yielding or elastic body intimately and firmly engaging with and bound to the inner surface of the tube and having a resiliency such that it provides an easy support for the rider and constantly tends to retake its former shape after being temporarily pressed therefrom.

The invention also consists of a tire having an exterior tube or sheathing and a filler, the latter being in two or more distinguishable parts, one part being intended to serve as a tread portion and having a relatively high specific gravity, and the other part being lighter and adapted to act suitably in the neighborhood of the wheel rim or felly and being of lighter specific gravity and both of said parts being intimately secured together and to the external tube.

The invention also consists in a novel tire-filling material adapted to meet the ends set forth.

The invention further relates to other matters, which will be fully understood from the description and the drawings and which will be recited in the claims.

In order that the invention may be understood, I will describe a tire having the features of novelty which characterize it, one such being selected for illustration in the drawings.

Figure 2:
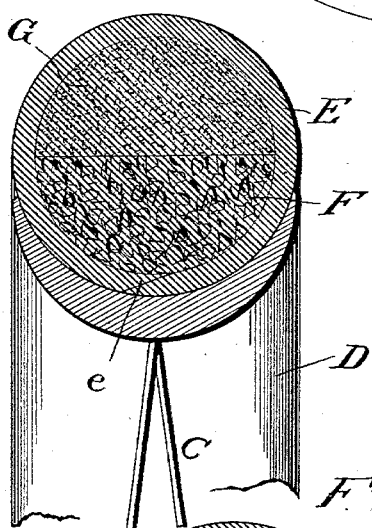
Figure 3:
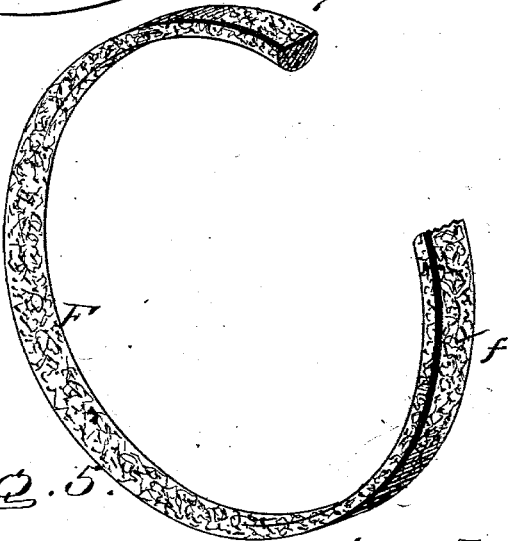
Figure 5:
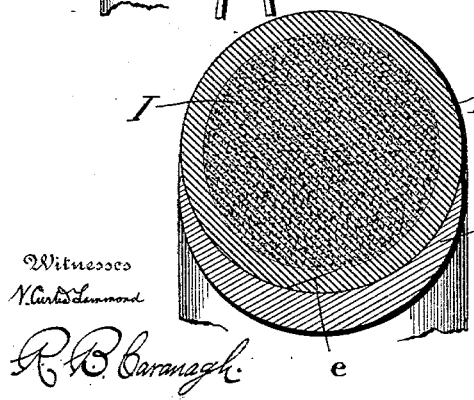
Figure 4:
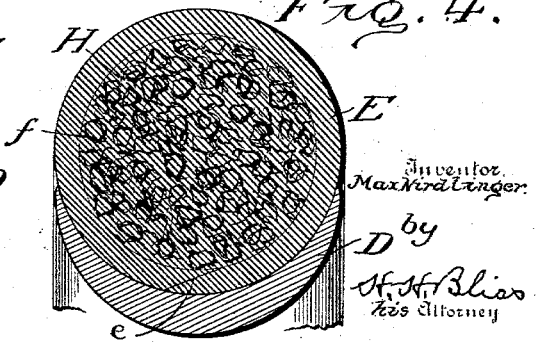

Figure 1 is a side view of a tire and of a wheel to which it is attached. Fig. 2 is a cross-section of the tire. Fig 3 is a perspective showing one part of the filler detached which is employed in the tire shown in Figs. 1 and 2. Fig. 4 shows a tire with a filler of a somewhat modified character when compared with that shown in Fig. 2. Fig. 5 illustrates another modification of the filler.

When making a tire of the character shown in Figs. 1, 2, and 3, I provide a sheet of rubber for an external tube E of substantially the common sort. Prior to securing the edges of this external tube or sheet together and vulcanizing I introduce the partial filler, (indicated by F.) This is made by mixing together suitable materials adapted to more or less harden or "set" and provide a mass which shall be rubber-like, resilient, and of little specific gravity. With the rubber-forming materials I provide masses of comminuted cork. The cork particles form substantially a continuous mass; but of course there is a large total interstitial area, the interstitices being filled with the rubber-like gummy adhering composition. The total mass, including the rubber mass and the cork, can be run into molds, so as to produce a filler of the sort shown at F. Preferably it is of the shape shown—that is to say, semicircular in cross-section, the curve of the curved side conforming substantially to that of the interior surface of the outer tube or sheathing. After this partial filler F has become sufficiently hardened and has been introduced into the tube-sheet the edges of the latter are brought together and vulcanized.

The diameter of the filler F is such that it occupies the part of the chamber in the tube which is toward the general center of the latter.

After the tube has been formed a filling-tube H is applied either by fastening it to the rubber tube or to the felly of the wheel, or to both. The filling-tube H has a valve or closing-piece I and a check-valve, if necessary, of any suitable construction, that at I being screw-threaded and adapted to permanently close the tube. After the manufacture has been carried to this stage I connect the tube H to the mechanism which supplies and introduces the final filler and which delivers it under considerable pressure to the tube. This part of the filler, which is indicated by G, is composed of ingredients capable of forming a rubber-like gummy resilient mass. While in a liquid or viscid condition, it is passed under pressure through the filling-tube H to the interior of the tube E. The pressure is so high that this liquid or viscid mass is forced into every crevice in the outer tube and into the minute spaces between the part F and the outer tube. The pressure is such that an intimate union is formed between the parts of the filler and between both of them and the inner surface of the outer tube, it being maintained at such a point that even if the filling mass has become hardened there is still more or less of a distending action exercised on the part E, and there is no possibility of either the outer sheathing or tube expanding away from the filler or of the latter contracting away from the tube. In these respects the present tire and the filler therein are to be clearly distinguished from the earlier articles consisting of an outer rubber tube and an inner or rubber-like or gummy mass which have in all cases within my knowledge been formed separately and the latter inserted into the former prior to its edges being joined and the effecting of the vulcanizing.

There can be more or less variation with respect to the composition of the fillers, so long as one or more of said compositions be of such nature that they can be delivered to the chamber in the tube B under pressure sufficient to effect an intimate union of the entire mass with the tube to prevent slipping or separating of the one as to the other. I, however, at present prefer to employ a composition of material and a method of compounding, treating, and applying them substantially as follows: Fourteen parts of glue, five parts of pine-tar, sixteen parts of petrea are taken and thoroughly commingled by heating in a steam-jacketed chamber until brought to the proper consistency. The petrea referred to is a glycerin-like body obtained in the reduction of hydrocarbon, and in lieu thereof any of the well-known forms of glycerin may be taken. The pine-tar I have found to be of advantage in many cases because of the desirable consistency which it imparts to the filling mass; but it is not necessary in all cases, and the liquid or viscid part of the composition can be composed of twenty-five parts of glue, forty-five parts of petrea, and thirty-five parts of syrup, more or less.

With some tires it is desirable to have them as light as possible and at the same time maintain the proper character of the interior filler. To lighten up the mass and to make it somewhat spongy when it cools or hardens, I employ in connection with one or the other of the above sets of ingredients two parts of calcium chlorid, two parts of saleratus, and one part of vinegar, four ounces of this latter composition being taken to one pound of either of the two above set forth. For the best results and in most cases these latter bodies should be introduced after those above referred to have been fully mixed in order that the filler shall at the time of introducing to the tube be in the desirable light and spongy condition. The ingredients after being mingled together are carefully heated by steaming, as aforesaid, and the rubber tube or sheathing which is to be filled is also brought to the same temperature as the composition. The heated composition is then introduced into the tube under pressure, suitable vents being provided to allow the escape of the air from the interior and to facilitate the operation. Before the composition becomes too cold or hard air-pressure is applied to the external mass of the filler, which pressure is transmitted to that part which is in the tube and gives it the desired density and forces it into the crevices and interstices wherever present inside of the external tube.

In many cases it is better to introduce a relatively small mass first and then subject it to the air-pressure until a thick strong coating is formed over all surfaces in the interior, and then more of the composition is injected until the interior chamber is finally completely filled and all vents or openings are sealed, and if upon further cooling and setting any shrinkage may be found to have occurred heavier pressure is applied with an injection of a sufficient quantity of the composition to fill all the weak spots or unfilled spaces.

In order to maintain the temperature of the tube or sheathing the same as that of the composition, the tube can be immersed in heated water.

A simple illustration of the result attained by employing the material applied in the way just described will be found at G in Fig. 2 and at I in Fig. 5 of the drawings; but as I desire to secure a still greater relative lightness of the filler, I, in the case of some articles, as bicycle-tires, prefer to slightly modify the matters above described. Prior to introducing any of the composition into the tube or sheathing E, I mix with a body of it as much of a mass as it will contain of comminuted cork, the latter being reduced to particles of the size of a pea, or therabout. The cork mass is introduced into the liquid or viscid material and thoroughly commingled therewith and agitated therein until the surfaces of all of its particles are thoroughly coated and the vescicles are filled as thoroughly as possible with the composition. Then I mold from this last-described mass elongated bodies, such as shown at Fig. 3, they being preferably in cross-section of the shape shown—that is to say, semicircular—but there may be considerable variation in this respect, as they may be concavo-convex instead of plano-convex, or they may be convex on both sides, the purpose being to have this part of the filler of such shape that after it is within the tube E there shall be left sufficient chamber or space to receive a liquid or viscid mass under pressure. After the filler F has become sufficiently hard it is placed within the rubber tube or sheathing E prior to the bringing together of the edges of the latter. After it is properly enveloped therein the edges e are secured and vulcanized in the ordinary way. Subsequent to these steps a mass of the viscid material is introduced in the way above described, the machinery employed and the process followed being preferably such as is set forth in another application of mine. As shown, the filling-tube H and valve I, above referred to, are used to receive and retain the liquid filler, which is introduced in the way above described, and when set or hardened is indicated by G in Fig. 2 and I in Fig. 5. It is caused to intimately adhere not only to the inner surface of the tube E, but also to the surfaces of the part F and, further, to bind together the external tube and this filler F around the convex surfaces of the latter. The part F being very largely constituted of cork is considerably lighter than the part E in Fig. 2, and consequently while it serves eminently well for that part of the tire which is in the neighborhood of the wheel frame or felly I find that for the purpose of a tread portion a solid body, such as that at G and I, is somewhat superior.

Where it is desired to have the wheel filled with this solid cushion, and also have it as light as possible, the entire mass can be charged with the cork particles, as shown in Fig. 4. In this case the intermediate step of molding filler-strips like that at F is dispensed with and the compound mass containing both the rubber ingredients and the cork particles is inserted under pressure in the way above described.

For the purposes herein described cork is mentioned as the best material which I have used, although it will be understood that numerous others are well known, which are substantial equivalents thereof, such as stalkpith, hair in commercial form, &c. It is to be further understood that I do not limit the invention to the exact proportions of the precise ingredients herein given, as a filling material substantially analogous can be employed in the way described without conforming to the exact details described.

What I claim is—

1. A tire for vehicles comprising a rubber tube having an interior chamber, in combination with a ring-like filler in the said chamber and smaller in cross-section than the chamber, and a supplemental filler for said chamber intimately adhering to and engaging with the interior surface of the tube and formed of an elastic adhesive material, substantially as set forth.

2. A tire for vehicles comprising a rubber tube and an interior chamber, in combination with a ring-like filler in said chamber made of a mixture of comminuted cork or equivalent material coated by or immersed in a mass of rubber-like material, and a mass of liquid or viscous filling material in that part of the chamber not occupied by the first-aforesaid filler, and formed of a yielding or spongy mixture, substantially such as described.

3. A filler for tires composed of the following ingredients in about the following proportions by weight, glue fourteen parts, glycerin sixteen parts, syrup twenty parts, sugar ten parts, pine-tar five parts, and an absorptive or fibrous vehicle, substantially as described.

4. A filler for tires composed of glue, glycerin, syrup, sugar and pine-tar in about the proportions specified, associated with a sponging mixture, composed of calcium chlorid, saleratus and vinegar, in about the proportions specified.

In testimony whereof I affix my signature in presence of two witnesses.

MAX NIRDLINGER.

Witnesses:
N. CURTIS LAMMOND,
RICHARD B. CAVANAGH.